(12) United States Patent
Barr

(10) Patent No.: US 7,755,611 B2
(45) Date of Patent: Jul. 13, 2010

(54) DECORATIVE CONCEALED AUDIO-VISUAL INTERFACE APPARATUS AND METHOD

(76) Inventor: Craig Barr, 2925 Alta Ter., La Cresenta, CA (US) 91214

( * ) Notice: Subject to any disclaimer, the term of this patent is extended or adjusted under 35 U.S.C. 154(b) by 968 days.

(21) Appl. No.: 11/115,477

(22) Filed: Apr. 26, 2005

(65) Prior Publication Data
US 2005/0195972 A1   Sep. 8, 2005

Related U.S. Application Data

(63) Continuation-in-part of application No. 10/097,768, filed on Mar. 14, 2002, now Pat. No. 6,993,129.

(51) Int. Cl.
*G06F 3/041* (2006.01)
(52) U.S. Cl. .................... 345/173; 345/156
(58) Field of Classification Search ......... 345/173–178, 345/710, 156, 200, 340; 379/435, 428.03
See application file for complete search history.

(56) References Cited

U.S. PATENT DOCUMENTS

| | | | | |
|---|---|---|---|---|
| 4,549,791 A | * | 10/1985 | Sharp | 248/634 |
| 5,956,181 A | * | 9/1999 | Lin | 359/630 |
| D453,374 S | * | 2/2002 | Taylor | D23/367 |
| 6,412,959 B1 | * | 7/2002 | Tseng | 359/839 |
| 6,433,676 B2 | * | 8/2002 | DeLine et al. | 340/425.5 |
| 7,176,790 B2 | * | 2/2007 | Yamazaki | 340/438 |
| 2002/0044065 A1 | * | 4/2002 | Quist et al. | 340/815.4 |
| 2002/0093481 A1 | * | 7/2002 | Kehlstadt | 345/156 |
| 2003/0021048 A1 | * | 1/2003 | Olijnyk et al. | 359/877 |
| 2003/0084109 A1 | * | 5/2003 | Balluff | 709/206 |

* cited by examiner

*Primary Examiner*—Henry N Tran
*Assistant Examiner*—Christopher E Leiby
(74) *Attorney, Agent, or Firm*—Terry L. Miller

(57) ABSTRACT

A decorative, disguised "mirror" interface apparatus appears to the uninformed as merely a decorative mirror, but includes an audio/visual output, the video display device of which is concealed behind a two-way mirror. So, when the video display is emitting light users of the apparatus can see the images provided by the display device through a two-way mirror material. Also, a transparent touch screen input device is associated with and overlays the two-way mirror material so that users of the interface apparatus may make inputs by simply making touches to selected locations of the "mirror."

18 Claims, 2 Drawing Sheets

DECORATIVE CONCEALED AUDIO-VISUAL INTERFACE APPARATUS AND METHOD

CROSS REFERENCE TO RELATED APPLICATION

This application is a Continuation-in-Part from U.S. patent application Ser. No. 10/097,768, filed Mar. 14, 2002, and entitled, "Mirror Communication System," now U.S. Pat. No. 6,993,129, issued, Jan. 31, 2006.

BACKGROUND OF THE INVENTION

1. Field of the Invention

This invention is in the field of interface apparatus and method for an electronic system, such as a home or office automation system, home security system, or video surveillance or monitoring system. More particularly, the present invention relates to such an interface for such a home or office electronic system which is aesthetically pleasing, is concealed, and which provides for user interface with the system through an interface apparatus which to the uninformed appears to be a decorative mirror, and which does not appear to be a surveillance display, a security system interface, an automation interface, or a communication or interface device of any kind.

2. Related Technology

As more and more homes incorporate more and higher levels of technology a new requirement has emerged. That is, more and more houses are incorporating home automation and visual surveillance systems. But, the current state of the art in user interface devices and methods for these home automation and visual surveillance systems provide, for example, a wall-mounted keypad and annuciator apparatus. For visual surveillance systems, either separate television monitors are provided, or the user can provide for the video images from the various security camera's to be displayed on common household televisions. Some more contemporary home security or video surveillance systems provide for the system to incorporate a touch screen display. But, the display device is nevertheless in open sight and is an apparent part of a home security or monitoring system. So, anyone who visits the home, such as delivery people, or workmen, who see the location where the monitor or display is located immediately have a good idea of the presence and nature of the home security system.

Several types of touch screen sensing technologies currently exist which are able to sense a touch on the device, i.e., on the front of a back lighted visual display, or cathode ray tube (CRT) of some type. These systems work well in their own right, except for one the one subjective, aesthetic, and practical drawback pointed out above. That is, the presence of the home security system is immediately apparent to anyone who sees the location of the display device, monitor, or interface device. The presence and some information about the nature of the security system at the home is also apparent. And finally, the home secuity system control and visual monitoring equipment may not itself be very attractive. That is, the apparatus may not be obtrusive when located in a computer room, but is certainly not part of a living room or kitchen décor. Yet, the living room, family room, kitchen, and bedroom are where residents of a home most want to be able to interface with their home security system.

Further to that above, while many users consider the look of the touch screen display panel obtrusive, they also go to great lengths to cover or hide the units from plain site. Users often mount the units in an operationally compromised location simply because they don't want them to be seen by guests, salespeople, workmen, and visitors.

Further to the above, touchscreen displays have become more and more commonplace, especially in commercial and industrial applications, as their price has steadily dropped over the past decade. There are three basic touch screen systems that are used to recognize a person's touch:
Resistive
Capacitive
Surface acoustic wave The resistive touch screen system consists of a normal glass panel that is covered with a conductive and a resistive metallic layer. These two sandwiched layers are held apart by spacers, and a scratch-resistant layer is placed on top of the sandwich structure. An electrical current runs through the two layers while the monitor is operational. When a user touches the screen, the two layers make electrical contact in that exact spot. The change in the electrical field is noted and the coordinates of the point of contact are calculated by the computer. Once the coordinates are known, a special driver translates the touch into touch locations coordinates that the operating system can understand, much as a computer mouse driver translates a mouse's movements into a click or a drag.

In the capacitive touch sensing system, a layer that stores electrical charge is placed on the glass panel of the monitor or display. When a user touches the monitor with his or her finger, some of the charge is transferred to the user, so the charge on the capacitive layer decreases. This decrease is measured in circuits located at each corner of the monitor. The computer calculates, from the relative differences in charge at each corner, exactly where the touch event took place and then relays that information to the touchscreen driver software. One advantage that the capacitive system has over the resistive system is that it transmits almost 90 percent of the light from the monitor, whereas the resistive system only transmits about 75 percent. This gives the capacitive system a much brighter and clearer picture than the resistive system.

On the monitor or display of a surface acoustic wave system, two transducers (one receiving and one sending) are placed along the x and y axes of the monitor's glass plate. Also placed on the glass are reflectors—they reflect an electrical signal sent from one transducer to the other. The receiving transducer is able to tell if the wave has been disturbed by a touch event at any instant, and can locate it accordingly. The wave setup has no metallic layers on the screen, allowing for 100-percent light throughput and perfect image clarity. This makes the surface acoustic wave system best for displaying detailed graphics (both other systems have significant degradation in clarity).

Another area in which the systems differ is in which stimuli will register as a touch event. A resistive system registers a touch as long as the two layers make contact, which means that it doesn't matter if a user touches it with a finger, a pen, a stylus, or any other object. A capacitive system, on the other hand, must have a conductive input, usually the user's finger, in order to register a touch. The surface acoustic wave system works much like the resistive system, allowing a touch with almost any object—except small objects like a pen tip, which do not have sufficient cross sectional area to make a measurable change in the wave pattern.

As far as price is concerned, the resistive touch screen system is the cheapest; its clarity is the lowest of the three, and its layers can be damaged by sharp objects. The surface acoustic wave system is usually the most expensive.

Further to the above, just about everyone has seen a television show or movie in which a criminal suspect is questioned while detectives watch from behind a one-way mirror.

Many people don't understand how a piece of glass manages to reflect light from one side while remaining clear on the other? The secret is that it doesn't remain clear on the other side. A one-way mirror has a reflective coating applied in a very thin, sparse layer—so thin that it's called a half-silvered surface. The name half-silvered derives from the fact that the reflective molecules (which may not be silver in color) coat the glass so sparsely that only about half the molecules needed to make the glass an opaque mirror are applied. Thus, at the molecular level, there are reflective molecules speckled all over the glass in an even or patterned film, but only half the surface area of the glass is covered. The half-silvered surface will reflect about half the light that strikes its surface, while letting the other half go straight through.

So, in the television shows or movies, why doesn't the "criminal suspect" see the detectives in the next room?. The answer lies in the relative lighting levels of the two rooms. The room in which the glass looks like a mirror is kept very brightly lighted, so that there is plenty of light to reflect back from the mirror's surface. The other room, in which the glass looks like a window, is kept dark, so there is very little light to transmit through the glass. On the criminal's side, the criminal sees his own reflection. On the detectives' side, the large amount of light coming from the criminal's side is what they predominantly see. If the lights in the room with the mirror are suddenly turned out, or the lights in the observation room are suddenly turned on, then the one-way mirror becomes essentially a window, with people in each room able to see those in the other.

SUMMARY OF THE INVENTION

In view of the foregoing disadvantages inherent in the known types of interface and communication systems of known designs and configurations now present in conventional technology, the present invention provides an improved interface apparatus, which might be termed a "mirror communication system." As such, the general purpose of the present invention, which will be described subsequently in greater detail, is to provide an alternate way for a user of the system to communicate with the system.

That is, in a home or office security system environment, the interface apparatus may look to the uninformed as an ordinary decorative mirror. The interface unit could be mounted in plain sight without casual observers ever knowing what it really was. That is, to the casual observer, the mirror appears to be and is a mirror. The decorative aspect of the mirror can be chosen to complement the décor of the user's home or office, for example. And, the interface unit can be programmed to turn off its backlight after a preset time after use and the unit would look like a mirror again. The user's touch or a preprogrammed event could turn on the backlight of the display backlight to reveal the display. Further the display portion of the touch screen can be programmed and configured to display security camera feeds and the touch screen control system can be programmed to route each signal to the desired area(s) of the touch screen display.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

The invention will be better understood and objects other than those set forth above will become apparent when consideration is given to the following detailed description thereof. Such description makes reference to the annexed drawings wherein:

DESCRIPTION OF THE PREFERRED EMBODIMENT

Figure 1:
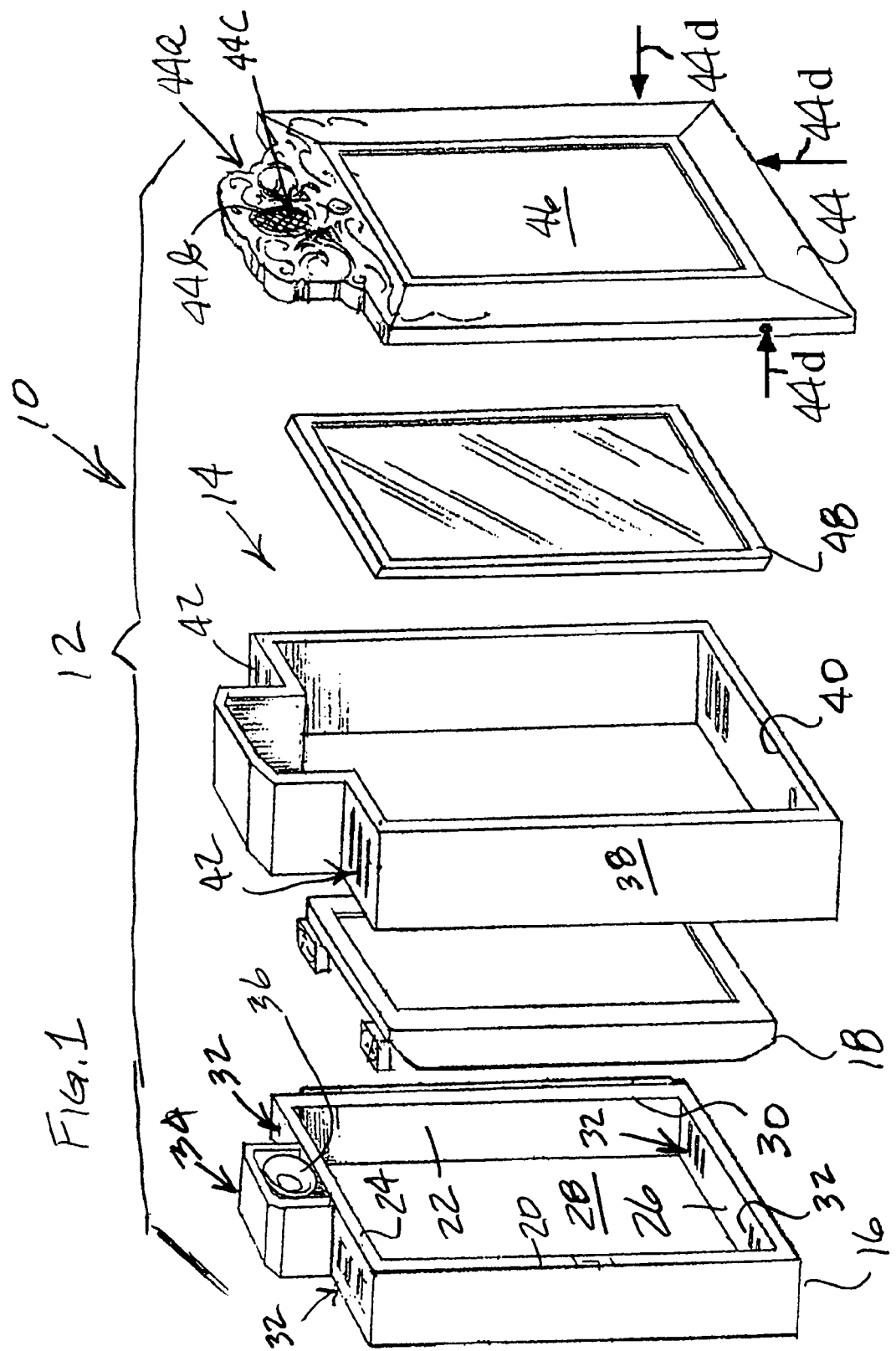
FIG. 1 is an exploded perspective illustration of an exemplary preferred embodiment of the present invention.
Figure 2:
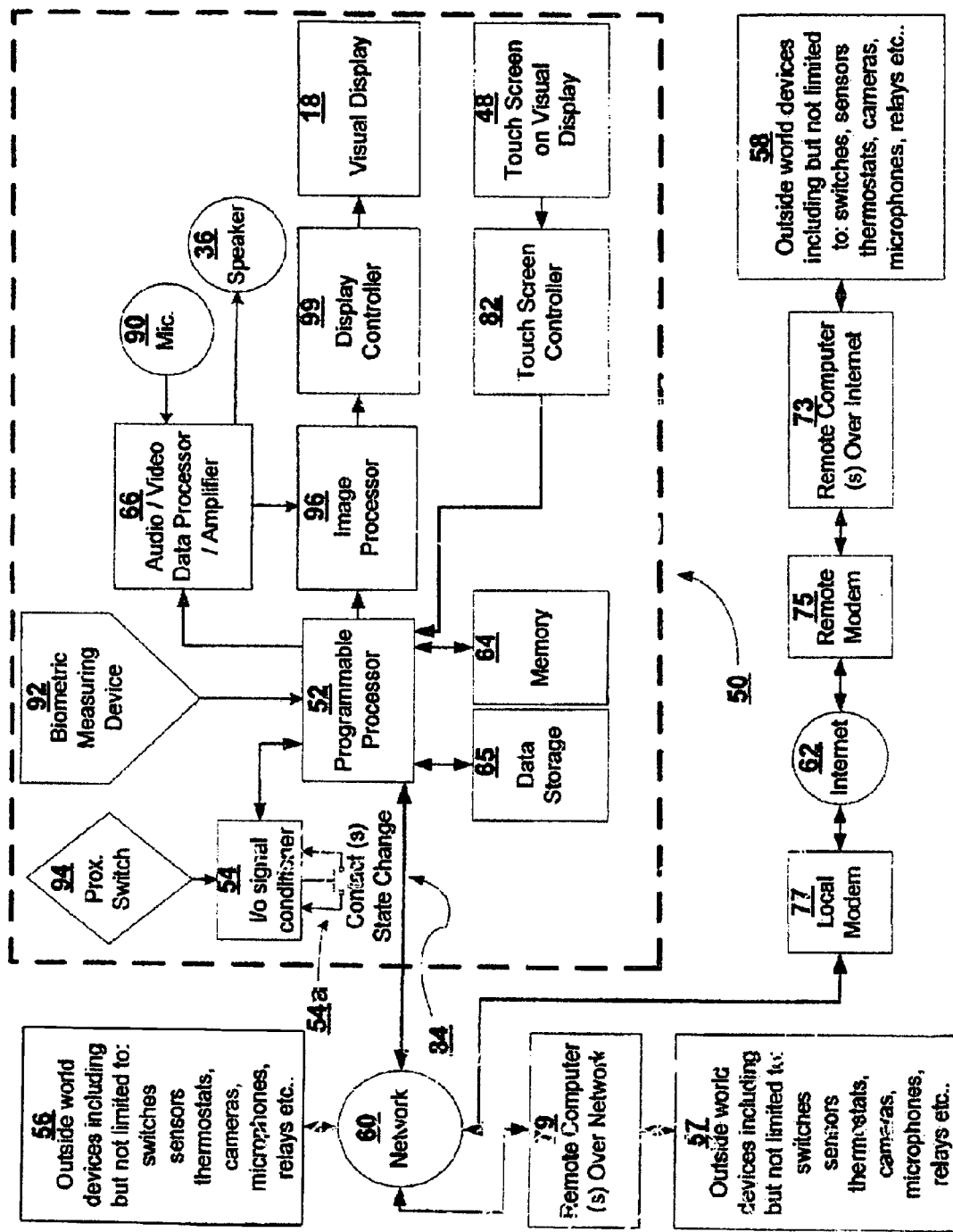
FIG. 2 is a schematic illustration of an exemplary embodiment of an electronic assembly associated with the interface apparatus of the present invention.

With reference now to FIGS. 1 and 2 taken in conjunction, and with attention first to FIG. 1, an exploded view of an interface apparatus 10 is presented. It will be appreciated that as applied in use the components of the interface apparatus (which are shown exploded for clarity of illustration in FIG. 1), will be assembled and will provide an apparatus which to the uninformed appears to be a decorative mirror. In fact, the apparatus 10 serves the function of a mirror. The interface apparatus 10 my be mounted on the surface of a wall, in which case it will have an apparent depth of a few inches. Or, alternatively, and more preferably, the interface apparatus 10 may be partially recessed into the supporting wall, in which case, the decorative frame of the "mirror" will appear to be hung or mounted to the wall itself, the structure of the apparatus behind the decorative frame is recessed into the wall, and the depth of the interface apparatus will appear to be no different than any other common decorative framed wall "mirror."

Considering FIG. 1 in greater detail, it is seen that the interface apparatus 10 includes a housing assembly, generally indicated with the numeral 12. The housing assembly 12 includes a decorative electronic support and display assembly, or decorative cabinet 14. The decorative cabinet includes a large enclosure 16 receiving a visual display 18 and other components of an electronic assembly (further described below). The large enclosure 16 is formed in a generally rectangular configuration, and includes first parallel vertical side walls 20, 22 and first parallel horizontal top 24 and bottom walls 26, as well as a back plate 28. The back plate 28 has an open front 30. The first parallel horizontal top and bottom walls may define a plurality of thin rectangular apertures, or cooling slots, 32 providing for the circulation of air in and out of the enclosure. Atop of the large enclosure 16, the decorative cabinet 14 also includes a small enclosure 34, and receiving a local display speaker 36. As seen, the small enclosure 34 is generally rectangular like the large enclosure 16, although the invention is not so limited. Further, it is to be noted that a local speaker need not be provided in some instances as the home or office in which the interface apparatus 10 is utilized will be wired for sound and have various local speakers (usually mounted overhead) and through which the interface apparatus may provide an audio output to a user of the device.

Also as is seen in FIG. 1, the decorative cabinet 14 may include an external decorative sheath 38. The decorative sheath 38 is configured to fit closely outside of and over the large enclosure 16 (and in this embodiment, also over small enclosure 34) in order to provide a decorative outer sheath or decorative outer skin over the large enclosure 16 and small enclosure 34 in instances when the interface apparatus 10 is mounted onto (rather than into) a support wall. When the decorative outer sheath 38 is utilized it may, for example, be pained to match the surrounding walls, or it may have another decorative surface treatment or coloration in harmonizing or contrasting colors, as the user may choose. It will be understood that when a user of the interface apparatus 10 chooses to mount the cabinet 14 into a supporting wall, then the outer or external decorative frame 38 may not be included in the assembly. When the decorative sheath 38 is employed, it is seen that an open front 40 of the sheath 38 is substantially coextensive with the front opening 30 of the large enclosure 16. Also, the decorative sheath 38 defines plural cooling slots 42 which generally align with the slots 32 so as to allow cooling air flow into and from the large enclosure 16.

In order to complete the disguise of the interface apparatus 10 as a decorative "mirror" the assembly 10 includes a decorative "mirror" frame 44 of a generally rectangular configuration. It will be understood in this context that the decorative frame 44 can be provided in any pleasing configuration so that an interface apparatus 10 could be configured, for example, to appear as a decorative "mirror" of round or oval configuration also. In this instance, the decorative frame 44 is adapted to cover both the large enclosure 16, the small enclosure 34, and to be substantially aligned with the decorative sheath 38 in frontal view of the apparatus 10. The decorative frame has an crest decoration 44a defining an apex aperture 44b with a sound permeable diaphragm 44c therein for allowing sound from the speaker 36 to easily reach a user of the apparatus 10. It will be noted that the decorative frame 44 defines a central opening, or "mirror" opening 46.

Interposed between the display 18 and the mirror opening 46 is a half-silvered or "mirrored" touch panel input device 48. That is, the touch panel device 48 serves both as a two-way mirror, and as a touch-sensitive or touch-responsive input device. In this respect, it is to be understood that the touch-sensitive input structure, and the two-way mirror can be integrated into a singular structure, or that these elements can be provided as separate structures associated with one another between the display 18 and the user of the interface assembly 10. As described above, a variety of technologies are currently available to provide the touch-responsive input function for the input device 48, and other technologies to effect this function will doubtlessly be developed in the future. The important aspect of the interface apparatus 10 is that it appears as a decorative mirror, and when the display 18 is activated the light from this display can reach a user by passing through a half-silvered mirror, and further, that associated with the half-silvered mirror is a touch-responsive panel or input interface device 48. In the present case, the half-silvered "mirror" function and the touch-responsive input device have been embodied in a single structure 48, although the invention is not so limited.

Before departing from the description of the decorative interface apparatus 10 of FIG. 1, it is well to note that the mirror frame 44 of the present embodiment includes one or more security "activation" features 44d. Perhaps the simplest embodiment of a security activation feature which may be employed with an interface 10 according to the present invention is one or more small aperture(s) each with a proximity sensor aimed outwardly through this aperture. The proximity sensor(s) may include, for example, a light emitting diode (LED) most preferably of the infrared variety so that its light emission is not visible to an observer of the apparatus 10, and a detector which may include a photodiode or phototransistor. In order to activate the apparatus 10 a user would place a finger near or over each of the aperture(s) and hold for a determined time (perhaps two seconds). Thus, the light emissions from the LED would be at least partially reflected back to the detector, providing a signal to an electronic controller of the apparatus 10. Thus, it will be appreciated that the security activation features 44d are connected with the electronic control (to be further described below) of the apparatus 10, so that it is activated only upon a predetermined condition being provided by an authorized user of the apparatus. Alternatively, one or more frame mounted activation sensor(s) which have to be activated in combination with a touch to a particular location of the touch screen panel could provide the desired level of security for the apparatus 10. An alternative embodiment could include a fingerprint scanner, a retinal scanner, voice recognition facility, or other personal identification device(s) located on, adjacent to, or concealed within the apparatus 10. Of course, a wide variety of combinations of such personal identification features, apparatus, or devices can also be used with the apparatus 10.

That is, while the present invention is not limited to any particular technology or combination of technologies for identification of a user, or for activating the apparatus, the embodiment of FIG. 1 provides one embodiment which will successfully prevent unintended activation of the apparatus (and thus prevent it being unintentionally revealed as a security system or home automation system interface rather then merely a "mirror"). Such an unintended activation of the apparatus could happen, for example, when a maid or house keeper is merely dusting or cleaning the "mirror." However, with a pair of the activation features 44d located at spaced apart locations on the frame 44, and each of which must be covered continuously for two seconds in order to activate the device 10, the likelihood that the apparatus would be turned on accidentally by a home or office visitor, or by a maid or house keeper, is greatly reduced. Also, in view of the above, alternative devices and methods for personal identification of an authorized user of the apparatus 10, and for preventing unintended activation of that apparatus 10, will suggest themselves.

Turning now to FIG. 2, a schematic illustration of an electronics assembly 50 (much of which my be enclosed within the rear of the large enclosure 16 if desired, although the invention is not so limited). As will be appreciated by those ordinarily skilled in the pertinent arts, the electronics assembly 50 may include a dedicated programmable processor 52 (that is a microprocessor which is dedicated to home automation, or to home security, or to the operation of a video surveillance system, or to one or more of the above) or the electronics assembly 50 my include a processor that is part of a user's home or office computer system, for example. That is, all or part of the functions performed by the processor of electronics assembly 50 may be performed by a home or office PC (or Mac) desktop computer. As such, the electronics assembly 50 may take a variety of different forms, of which the arrangement of FIG. 2 is simply an exemplary and preferred embodiment, and to which the invention is not exclusively limited.

Considering now FIG. 2 in greater detail, it is seen that the electronics assembly 50 further includes an I/O (input/output) signal conditioner 54 providing an interface for one or more "state change" switch contacts 54a (which may include window or door sensor switches, for example). The I/O signal conditioner 54 also provides interface for one or more proximity switch and/or other types of sensors, generally indicated with the numeral 94 (which may include motion detectors, heat detectors, glass breakage sensors, carbon monoxide sensors, smoke detectors, ion or ozone (i.e., flame or electrical short/arcing) detectors, and other devices the user may choose to interface with the apparatus 10.

Further, the processor 52 is also provided with an interface 34 via a network connection 60 with a suite of outside world devices 56, which may include switches, sensors, thermostats, camera, microphones, relays, etc. The network interface 60 also provides for connection (i.e., virtual connection) of a remote computer(s) network 79, as well as other suite(s) 57 of outside world devices. That is, the apparatus 10 can thus be used by a user at home, or at the office, for example, to control or view information from a remote automation or security system. So, for example, the user of an apparatus 10 while at the office may control or view information from a home automation/security system, and vice versa if the home location is so equipped.

Still further, the network interface 60 provides for connection (again, virtual connection) of a local modem 77, and via this modem, connection to the internet 62. As will be readily understood by those ordinarily skilled in the pertinent arts, this internet connection 62, then provides for connection via another remote modem 75 of a remote computer(s), as well as possibly another suite(s) of outside world devices 58. By such an expanding network capability, the apparatus 10 can provide a user at the home, or at the office, for example, the ability to check on each of several other remote locations, to control automation/security systems at each of these locations, as well as to view, for example, security camera images from these remote locations.

Returning now for further consideration of the apparatus illustrated in FIG. 2, it is seen that this apparatus includes both a data storage facility 65, and a memory (i.e., system memory, ram memory, and/or hard disk memory, for example). An audio/video data processor/amplifier 66 interfaces with the processor 52 in order to provide an output to speaker 36, and an input from microphone 90. Also, this processor/amplifier 66 provides an interface with image processor 96 to provide still and moving video images to a display controller 99 and to the video display 18.

Similarly, the touch screen 48 provides input to a touch screen controller 82, which provides input to the processor 52 so that the fact of and location of a touch by a user of the apparatus 10 on screen 48 (recalling FIG. 1) is indicated to and via the processor 52.

Having observed the construction of the interface assembly 10 and of the electronics assembly 50 associated with it, it is now possible to consider examples of the operation of these components in combination in a use environment. If, for example, the interface assembly 10 is used in a home, as part of a home automation and home security system, then the "mirror" 12 can be installed anywhere the user wishes and it will appear to the uninformed to be merely a decorative wall-hung mirror. In fact, the "mirror" 12 is fully usable as a mirror by anyone who wishes to do so. But, for the informed residents of the home, for example, the "mirror" 12 provides for both a visual and audio output from the home automation and security system, as will be appreciated in view of the fact that the speaker 36 can provide audio outputs, while the display 18 can provide images visible through the two-way "mirror" 48 (which is also a touch screen input device). The display 18 can be turned on or activated by a user of the system by touching the screen 48 in a particular location, or perhaps by speaking a pre-selected phrase to the "mirror" 12, with the speaker 36 also serving as a microphone for this purpose. For such a function, the processor 52 would be programmed with voice recognition software.

And, further, the display 18 when activated can be used to provide any variety of input indicia which the user may select by touching the appropriate place on the touch screen "mirror" 48. For example, in the operation of a home security system, the display 18 could be used to present a floor plan of the home, with the locations of security cameras highlighted. And the user would select a security camera for display of the video image from that camera by touching the location of the highlighted camera on screen 48 over the image of that camera provided by display 18.

In response to such a touch input from the user of the system 10, the processor 52 determines from the location of the user's touch which of the available video cameras has been selected and routes video from that camera to the display 18.

Another use of the interface apparatus 10 would be to provide a video image of a keyboard on the display 18, and to provide for the user to perform programming or selection processes by "typing" the inputs or commands into the electronics assembly 50 by making appropriate "touches" on the "mirror" 48.

While the invention is not so limited, another use of the interface apparatus 10 would be for the display 18 to provide an image of the usual control panel of a home security system including the indicator lamps and keypad, and for the user to make inputs to the home security system, including keypad inputs, simply by touching appropriate places of the "mirror" 48. In this case, the home security system could be controlled by a "wall mirror" placed near the front door, for example, and the residents of the house would use the "mirror" to control the security system. But, importantly, casual visitors to the home and others who come to the front door of the home would not be alerted to the presence or type of the home security system by the presence of a conventional control panel. Further, the aesthetics of the decorative "mirror" interface assembly 10 can be more easily blended into the home décor than can a conventional control panel.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A decorative, disguised "mirror" interface apparatus for mounting to a building wall such as in a home or office, said disguised interface apparatus providing audio/visual content to a user, and for receiving inputs from the user in response to touch inputs by the user at determined locations of a "mirror" while appearing to the uninformed only as a decorative wall mirror, said apparatus comprising:

a housing configured for mounting to and within a building wall;

a light emitting display device received in said housing for providing a visual display output;

a two-way mirror received in said housing and interposed between said display device and a viewer of the apparatus, so that when the interface apparatus is powered on and active, but said display device is not emitting light a viewer perceives only a wall-mounted decorative mirror and receives only a reflection as from an ordinary mirror devoid of both a visual display output image and of input location indicia, and when the display device is emitting light to provide a visual display output image the image is visible to a user of the device through the two-way mirror;
a transparent touch screen apparatus interposed between the user and the two-way mirror so that a user in response to an image provided by said display device and including input location indicia may make inputs by directly or indirectly touching or pointing at an input location of the touch screen apparatus.

2. The decorative, disguised "mirror" interface apparatus of claim 1, wherein said apparatus further includes a speaker for providing audio output to a user of the apparatus.

3. The decorative, disguised "mirror" interface apparatus of claim 2, wherein said speaker is also disguised in decorations of the apparatus.

4. The decorative, disguised "mirror" interface apparatus of claim 2, wherein said apparatus further includes:
a controller having a processor;
operating memory;
a video output driver;
an audio output driver;
signal conditioning facility for receiving input signals from selected input devices;
a network interface;
a web interface;
a touch screen interface driver;
a video output display device; and
a touch-sensitive panel overlying said video output display device.

5. The decorative, disguised "mirror" interface apparatus of claim 1, wherein said display device further includes at least one concealed activation sensor for effecting activation of the display device in response to a determined input from a user of the apparatus.

6. The decorative, disguised "mirror" interface apparatus of claim 5, wherein said at least one concealed activation sensor includes a mirror frame portion of said apparatus receiving said activation sensor.

7. The decorative, disguised "mirror" interface apparatus of claim 6, wherein said mirror frame portion of said apparatus defines an aperture, and said activation sensor is arranged to detect a change in a level of light at said aperture.

8. The decorative, disguised "mirror" interface apparatus of claim 1, wherein said display device is substantially of rectangular configuration, and said apparatus similarly is substantially rectangular in configuration.

9. The decorative, disguised "mirror" interface apparatus of claim 1, wherein said apparatus further is free of visible power and of visible signal input/output cords and cables, so that when the interface apparatus is powered on and active, but said display device is not emitting light a viewer receives only a reflection as from an ordinary mirror and sees no power or signal cords or cables and perceives only a decorative wall mirror.

10. A method of providing a decorative, disguised "mirror" interface apparatus for providing audio/visual content to a user, and for receiving inputs from the user in response to touch inputs by the user at determined locations of a "mirror" while appearing to the uninformed only as a decorative mirror, said apparatus comprising:
providing a housing configured for mounting on and within a wall of a building;
within said housing providing a light emitting display device for providing a visual display output;
concealing all power and signal/data cabling for said interface apparatus within the wall of the building so that such power and signal/data cabling is not visible;
providing a two-way mirror received in said housing and interposed between said display device and a viewer of the apparatus, and when the interface apparatus is powered on and active, but the display device is not emitting light utilizing said two-way mirror to provide to a viewer only a reflection as from an ordinary mirror devoid of both a visual display output and of input location indicia; and when the display device is emitting light to provide a visual display output image utilizing the two-way mirror to transmit the image to the user of the apparatus;
associating a transparent touch screen apparatus with and overlaying the two-way mirror so that a user in response to an image provided by the display device and including input location indicia may make inputs to the apparatus by touching the apparatus on an input location surface portion of the touch screen.

11. The method of claim 10 further including the step of providing a speaker for providing an audio output to a user of the apparatus.

12. The method of claim 11 further including the step of disguising the speaker in decorations of the apparatus.

13. The method of claim 12 further including the steps of:
providing said interface apparatus with a controller having a processor;
providing the processor with operating memory;
associating a video output driver with said processor;
associating an audio output driver with said processor;
providing a signal conditioning facility for receiving input signals from selected input devices and providing those input signals conditioned to and for said processor;
providing said processor with a network interface;
providing said processor with a web interface;
providing a touch screen interface driver;
providing a video output display device; and
providing a touch-sensitive panel overlying said video output display device for receiving touch inputs and providing location information for said touch inputs to said processor via said touch screen interface driver.

14. The method of claim 11 further including the step of selecting said display device to be of substantially rectangular shape, and configuring said interface apparatus similarly of substantially rectangular configuration to receive said display device therein.

15. A disguised interface apparatus for providing audio/visual content to a user, and for receiving inputs from the user in response to touch inputs by the user at determined locations of a "mirror," said apparatus comprising:
a housing configured for mounting to and within a wall of a building, and for receiving all power and data/signal for said apparatus within said wall so that such power and data/signal cabling is not visible;
a light emitting display device received in said housing for providing a visual display output;
a half-silvered mirror received in said housing so as to be interposed between said display device and a viewer of the apparatus and to transmit said visual display output to a user, and when said interface apparatus is powered on and active, but said light emitting display device is not emitting light said half-silvered mirror providing to a user only a reflection as from a common mirror;
a touch screen apparatus associated with the half-silvered mirror so as to provide an input response to a touch or point by a user at a determined location of the touch screen apparatus as indicated by an input location indicia provided by light emitted from said light emitting display device.

16. The disguised interface apparatus of claim 15, wherein said apparatus further includes at least one concealed activation sensor for effecting activation of the display device in response to a determined input from a user of the apparatus.

17. The disguised interface apparatus of claim 16, wherein said at least one concealed activation sensor includes a mirror frame portion of said apparatus receiving said activation sensor.

18. The disguised interface apparatus of claim 17, wherein said mirror frame portion of said apparatus defines an aperture, and said activation sensor is arranged to detect a change in a level of light at said aperture, whereby said determined input from a user of the apparatus may include the user covering said aperture for a certain time in order to reflect light projecting from said aperture.

* * * * *